US007114099B2

(12) United States Patent
Bhattacharjee et al.

(10) Patent No.: US 7,114,099 B2
(45) Date of Patent: Sep. 26, 2006

(54) METHOD, SYSTEM, AND APPARATUS FOR UTILIZING DEVICE-SPECIFIC DIAGNOSTIC SETTINGS WITHIN A STANDARD MANAGEMENT PLATFORM

(75) Inventors: Saikat Bhattacharjee, Norcross, GA (US); Ganesan Vengateswaran, Chennai (IN); Paul A. Rhea, Lawrenceville, GA (US); Stefano Righi, Lawrenceville, GA (US)

(73) Assignee: American Megatrends, Inc., Norcross, GA (US)

( * ) Notice: Subject to any disclaimer, the term of this patent is extended or adjusted under 35 U.S.C. 154(b) by 560 days.

(21) Appl. No.: 10/352,577

(22) Filed: Jan. 31, 2003

(65) Prior Publication Data
US 2004/0153775 A1 Aug. 5, 2004

(51) Int. Cl.
*G06F 11/00* (2006.01)
(52) U.S. Cl. .......................... 714/25; 714/31
(58) Field of Classification Search .................. 714/25, 714/31
See application file for complete search history.

(56) References Cited

U.S. PATENT DOCUMENTS

| | | | | |
|---|---|---|---|---|
| 5,023,873 A | * | 6/1991 | Stevenson et al. | 714/4 |
| 6,467,054 B1 | * | 10/2002 | Lenny | 714/42 |
| 2002/0103612 A1 | * | 8/2002 | Szucs et al. | 702/122 |
| 2003/0028826 A1 | * | 2/2003 | Balluff | 714/44 |
| 2003/0140279 A1 | * | 7/2003 | Szucs et al. | 714/31 |

OTHER PUBLICATIONS

"A Diagnostic Model In CIM," Distributed Management Task Force-DMTF, Jan. 6, 2000, www.dmtf.org/var/release/Whitepapers.
U.S. Appl. No. 10/358,515, filed Feb. 5, 2003, entitled "Method and System for Logging and Accessing Diagnostic Result Messages," Inventors: Paul Anthony Rhea; Saikat Bhattacharjee; Satheesh Thomas.
U.S. Appl. No. 10/355,315, filed Jan. 31, 2003, entitled "Event Mechanism For Reporting Diagnostic Event Messages," Inventors: Saikat Bhattacharjee; Paul Anthony Rhea; Ganesan Vengateswaran.

* cited by examiner

*Primary Examiner*—Dieu-Minh Le
(74) *Attorney, Agent, or Firm*—Hope Baldauff Hartman, LLC

(57) ABSTRACT

A method, system, and apparatus are provided for performing a diagnostic test on one or more managed system elements. The system includes a managed system element upon which the diagnostic test may be performed, a diagnostic setting object, and a diagnostics control module. The diagnostic setting object is derived from an industry-standard diagnostic setting object prototype and includes one or more properties specified by the prototype and a device-specific settings property identifying one or more settings for the diagnostic test specific to the managed system element. The diagnostics control module performs the diagnostic test on the managed system element and customizes the test according to the device-specific settings property in the diagnostic setting object. The diagnostic setting object may also include a precedence property that indicates whether the device-specific settings property should be utilized by the diagnostics control module rather than any default properties specified by the industry-standard diagnostic setting object prototype.

14 Claims, 15 Drawing Sheets

METHOD, SYSTEM, AND APPARATUS FOR UTILIZING DEVICE-SPECIFIC DIAGNOSTIC SETTINGS WITHIN A STANDARD MANAGEMENT PLATFORM

TECHNICAL FIELD

Embodiments of the invention generally relate to the field of computer diagnostics and, more particularly, to the field of utilizing device-specific diagnostic settings within an industry standard management platform.

BACKGROUND OF THE INVENTION

Diagnostic application programs, also called "diagnostics," provide functionality for testing components in a computer system. Typical diagnostics include a console application program that allows a user to control the operation of the diagnostics and one or more diagnostics modules that perform the actual diagnostic tests. Diagnostics modules are available that can test virtually all of the components in a computer system. For instance, diagnostic modules exist for testing the operation of central processing units, main memory, mass storage devices, video cards, input/output devices, network devices, and other components of a computer system.

In the past, console applications from one manufacturer were incompatible with diagnostics modules provided by another manufacturer. Over time, however, standard management platforms evolved that allow, among other things, diagnostic modules and console applications provided by different manufacturers to be used interchangeably. For instance, the Common Diagnostic Model ("CDM") defines standard enabling building blocks that allow "plug-in" diagnostics modules to be integrated with console application programs, also called management applications. This allows management applications to control and execute diagnostics modules meant for different devices, and provided by different manufacturers, over a single, uniform, and consistent interface. The CDM architecture is scalable and applicable to many platforms.

Although standard management, or instrumentation, platforms, such as those implementing CDM, allow greater interoperability between diagnostics modules and management applications, these platforms also have their limitations. In particular, one limitation is caused by the fact that standard management platforms do not allow the use of device-specific diagnostic settings. For instance, under the standard implementation of CDM, a specific block size cannot be supplied for a hard disk drive to be tested. Therefore, the hard disk drive diagnostic test cannot be customized based upon the block size utilized by the hard disk to be tested. Without utilizing device-specific diagnostic settings, standard management platforms cannot test each device completely. Therefore, in light of the above, there is a need for a method, system, and apparatus that allows device-specific diagnostic settings to be utilized by diagnostics operating within an industry standard management platform.

SUMMARY OF THE INVENTION

Embodiments of the present invention solve the above-described problems by providing a method, system, and apparatus for utilizing device-specific diagnostic settings within a standard management platform. In particular, according to one embodiment of the invention, a system is provided for performing a diagnostic test on one or more managed system elements. The system includes a managed system element upon which the diagnostic test may be performed, a diagnostic setting object, and a diagnostics control module.

The diagnostic setting object is derived from an industry-standard diagnostic setting object prototype, and includes one or more properties specified by the prototype and a device-specific settings property identifying one or more settings for the diagnostic test specific to the managed system element. The device-specific settings property may be expressed using the extensible markup language ("XML") and may include XML elements identifying the managed system element and the diagnostic test. The diagnostics control module performs the diagnostic test on the managed system element and customizes the test according to the device-specific settings property in the diagnostic setting object.

According to one embodiment of the invention, the diagnostic setting object also includes a precedence property that indicates whether the device-specific settings property should be utilized by the diagnostics control module rather than any default properties specified by the industry-standard diagnostic setting object prototype. The diagnostic control module may then utilize the precedence property to determine whether the default properties or the device-specific settings property should be utilized when performing the diagnostic test.

According to another embodiment of the invention, a method is provided for performing a diagnostic test on one or more managed system elements. According to one embodiment of the method, the identities of a managed system element and a diagnostic test to be performed on the managed system element are received. One or more device-specific diagnostic settings that are specific to the managed system element are also received. A diagnostic setting object is then derived from an industry-standard diagnostic setting object prototype. The diagnostic setting object includes one or more properties specified by the industry-standard diagnostic setting object and a device-specific settings property that identifies the device-specific diagnostic settings. A diagnostics control module may then be executed for actually performing the diagnostic test in a manner customized according to the device-specific settings property.

According to yet another embodiment of the invention, an XML data structure is provided for use in performing a diagnostic test on a managed system element. The XML data structure includes a device name tag identifying the managed system element, a test name tag identifying the diagnostic test, and one or more device-specific setting tags that identify one or more settings for the diagnostic test that are specific to the managed system element. The XML data structure is configured for use within a diagnostic setting object derived from an industry-standard diagnostic setting object prototype. The diagnostic setting object includes one or more properties specified by the industry-standard diagnostic setting object prototype and a device-specific settings property that includes the XML data structure.

Embodiments of the invention also provide an apparatus and computer-readable medium for utilizing device-specific diagnostic settings within a standard management platform. Additional details regarding the various embodiments of the present invention will be described in greater detail in the Detailed Description that follows.

DETAILED DESCRIPTION OF AN ILLUSTRATIVE EMBODIMENT

As described briefly above, embodiments of the present invention provide a method, system, apparatus, and computer-readable medium for utilizing device-specific diagnostic settings within a diagnostic module executing within a standard management platform. Referring now to the figures, in which like numerals represent like elements, several illustrative embodiments of the present invention will be described. It should be appreciated that the embodiments described herein are merely illustrative and that the various embodiments may be combined, other embodiments may be utilized, and structural, logical, and electrical changes may be made without departing from the spirit and scope of the present invention. The following detailed description is, therefore, not to be taken in a limiting sense, and the scope of the present invention is defined only by the appended claims and their equivalents.

Figure 1:
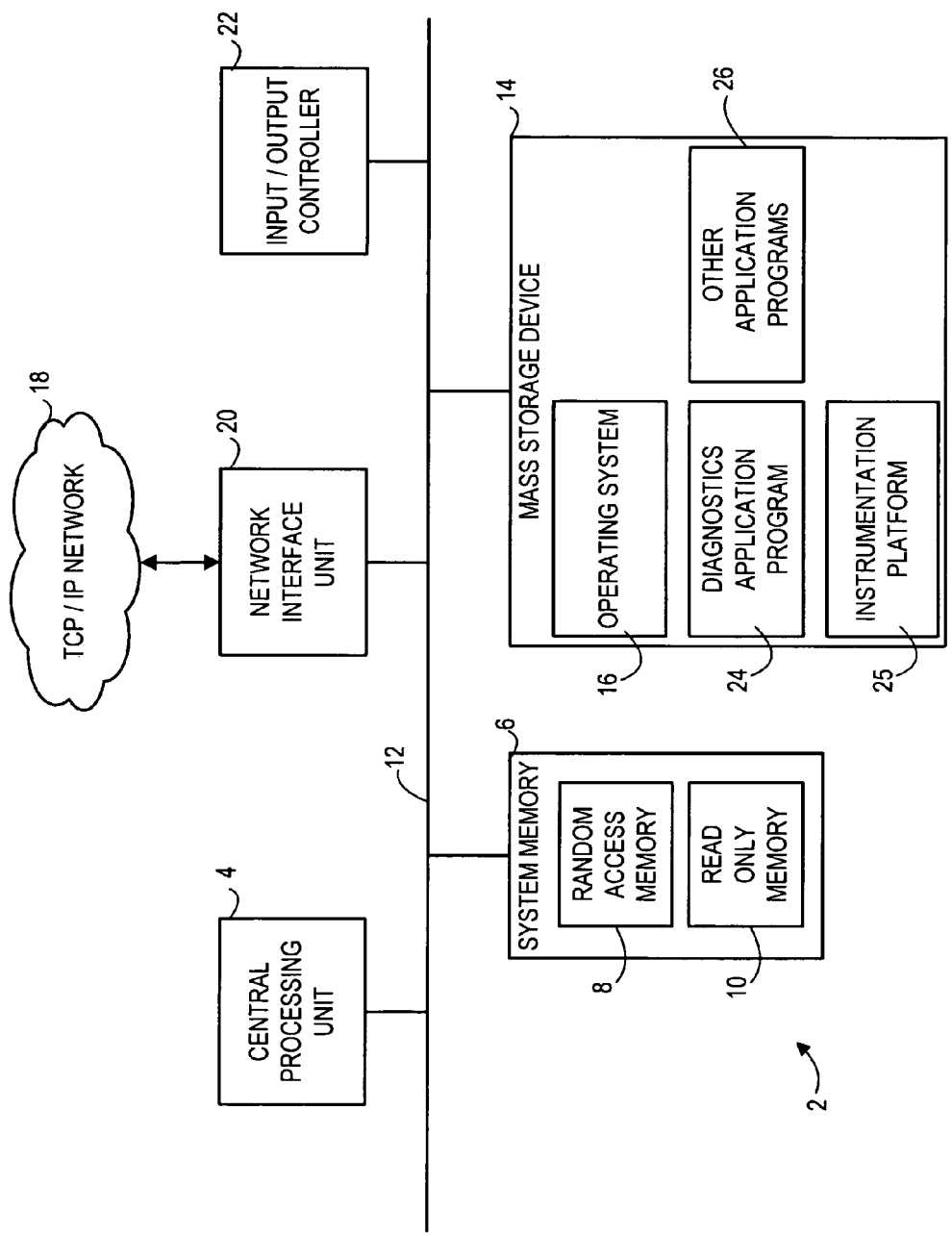
FIG. 1 is a block diagram showing an illustrative architecture for a computer utilized to practice various embodiments of the present invention.

Turning now to FIG. 1, an illustrative computer architecture for a computer 2 for practicing the various embodiments of the invention will be described. The computer architecture shown in FIG. 1 illustrates a conventional computer system, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, programs, such as a diagnostics application program 24, an instrumentation platform 25, other applications programs 26, and data.

The mass storage device 14 is connected to the CPU 4 through a mass storage controller (not shown) connected to the bus 12. The mass storage device 14 and its associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embodies computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

According to various embodiments of the invention, the computer 2 may operate in a networked environment using logical connections to remote computers through a TCP/IP network 18, such as the Internet. The computer 2 may connect to the TCP/IP network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the computer 2, including an operating system 16 suitable for controlling the operation of the computer 2, such as the WINDOWS family of operating systems from MICROSOFT CORPORATION of Redmond, Wash. Other types of suitable operating systems may also be utilized. The mass storage device 14 and RAM 8 may also store one or more executable programs. In particular, the mass storage device 14 and RAM 8 may store a diagnostics application program 24.

The diagnostics application program 24 is one or more executable programs for performing tests on the computer 2 and diagnosing failures and potential failures within the various systems of the computer 2. The diagnostics application program 24 may perform tests on the mass storage device 14, the system memory 6, the network interface unit 20, and other components of the computer 2. Additional details regarding the architecture and operation of the diagnostics application program 24 according to the various embodiments provided herein will be provided below with respect to FIGS. 2–9.

As described briefly above, the mass storage device 14 and RAM 8 may store an instrumentation platform 25. As known to those skilled in the art, the instrumentation platform 25 comprises one or more executable programs for modeling components within a computer system and for receiving configuration, status, and operational information from the components. The instrumentation platform 25 is also capable of executing diagnostics on system components and receiving events generated by system components. Additional details regarding the use and operation of an illustrative instrumentation platform 25 will be described below with reference to FIG. 5.

Figure 2:
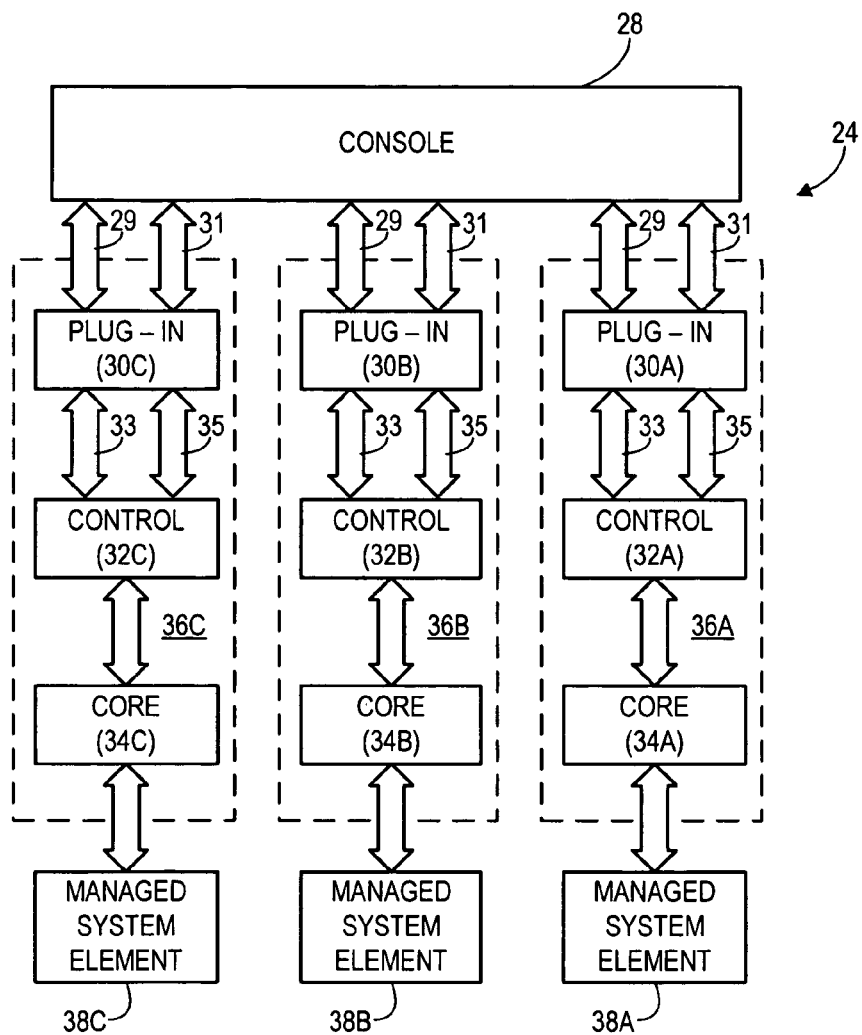
FIG. 2 is a software architecture diagram showing an illustrative software architecture for a diagnostics application program provided according to one embodiment of the present invention.

Turning now to FIG. 2, various aspects of a diagnostics application program 24 will be described. As mentioned briefly above, the diagnostics application program 24 comprises one or more executable software components capable of performing tests on the computer 2 and diagnosing failures and potential failures within the various systems of the computer 2. According to one embodiment of the invention, the diagnostics application program 24 is implemented as a multi-layer stack. At the top of the stack is a console application 28 and at the bottom of the stack is one or more managed system elements 38A–38C.

The console application 28 comprises an executable application program for controlling the operation of the diagnostics application program 24. For instance, the console application 28 may receive user input identifying particular managed system elements 38A–38C upon which diagnostics should be performed. The console application 28 may also receive the identities of particular tests that should be performed on the managed system elements 38A–38C. Additionally, the console application 28 may receive and display information regarding the progress of the diagnostic and its success or failure once the diagnostic has been completed. The console application 28 may also provide other functionality for executing diagnostics in a batch mode.

In order to provide the above-described functionality, the console application 28 communicates with a diagnostics "triplet" 36A–36C for each managed system element 38A–38C. A triplet 36A–36C comprises a plug-in 30A–30C, a diagnostics control module 32A–32C, and a diagnostics core 34A–34C. The plug-ins 30A–30C relay diagnostic information between the console 28 and the control 32 and convert system information from a proprietary format to a format usable by the console 28. Moreover, the plug-ins 30A–30C receive input such as the selection of particular diagnostic test settings and pass the information to the connected diagnostics control module 32. Other types of commands, such as commands for starting or stopping a diagnostic, may also be passed from the plug-ins 30A–30C to the appropriate diagnostics control module 32A–32C. In order to facilitate communication between the plug-ins 30A–30C and the console application 28, an interface 29 is provided for exchanging system information and a separate interface 31 is provided for exchanging diagnostic information.

The diagnostic cores 34A–34C communicate directly with the appropriate managed system element 38A–38C and perform the actual diagnostic tests. The diagnostic cores 34A–34C also gather information about a particular managed system element 38A–38C and pass the information to the appropriate diagnostics control modules 32A–32C. The diagnostics control modules 32A–32C then pass the information back to the appropriate plug-in 30A–30C.

According to various embodiments of the invention, the diagnostics control modules 32A–32C and the plug-ins 30A–30C are implemented as component object model ("COM") objects. The diagnostics control modules 32A–32C and the plug-ins 30A–30C communicate via an interface 33 for exchanging system information 33 and a separate interface 35 for exchanging diagnostic information. The diagnostic cores 34A–34C are implemented as standard dynamically linked libraries ("DLLs").

It should be appreciated that a managed system element 38A–38C may comprise any of the components of a computer system, including software components. For instance, a managed system element 38A may comprise a graphics card or processor, an audio card or processor, an optical drive, a central processing unit, a mass storage device, a removable storage device, a modem, a network communications device, an input/output device, or a cable. It should also be appreciated that this list is merely illustrative and that managed system elements 38A–38C may comprise other types of computing components.

Figure 3:
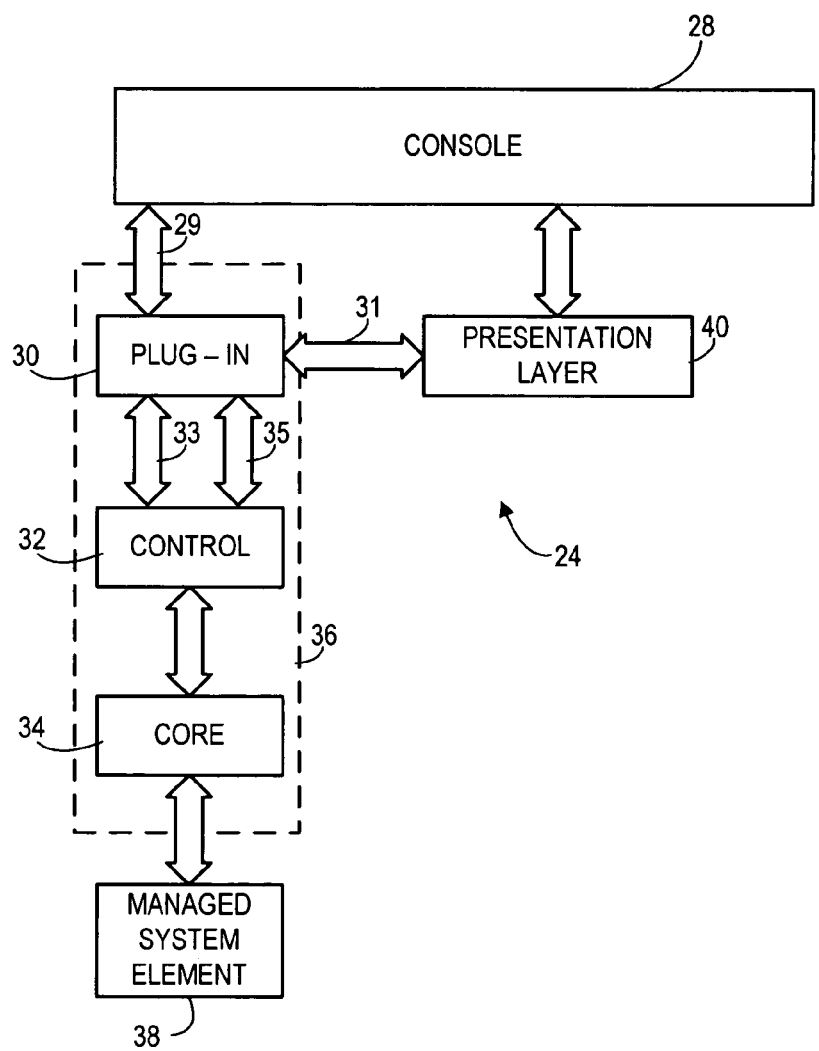
FIG. 3 is a software architecture diagram showing aspects of an illustrative software architecture for a diagnostics application program provided according to one embodiment of the present invention.

Referring now to FIG. 3, additional aspects of a diagnostics application program 24 provided according to various embodiments of the invention will be described. As shown in FIG. 3, a separate presentation layer 40 for diagnostic information may be interposed between each of the plug-ins 30A–30C and the console application 28. The console application 28 and the plug-ins 30 retain the interface 29 for communicating system information. However, the console application 28 and the plug-ins 30A–30C can communicate diagnostics information through the presentation layer 40 as if they were communicating directly with each other.

According to various embodiments of the invention, the presentation layer 40 provides an interface to the plug-ins 30A–30C to external programs. For instance, according to one embodiment of the invention, the presentation layer 40 provides functionality for utilizing the diagnostics triplet 36 with a console other than the console application 28, such as a console application provided by a third-party manufacturer. Similarly, the presentation layer 40 may provide functionality for accessing the triplet 36 from a script or a Web page.

In order to provide the above-described functionality, the presentation layer 40 is implemented as an ACTIVEX control in one embodiment of the invention. As known to those skilled in the art, ACTIVEX controls are a type of COM component that can self-register. COM objects implement the "IUnknown" interface but an ACTIVEX control usually also implements some of the standard interfaces for embedding, user interface, methods, properties, events, and persistence. Because ACTIVEX components can support the object linking and embedding ("OLE") interfaces, they can also be included in Web pages. Because they are COM objects, ACTIVEX controls can be used from languages such as VISUAL BASIC, VISUAL C++, and VBSCRIPT from MICROSOFT CORPORATION, and JAVA from SUN MICROSYSTEMS.

Figure 4:
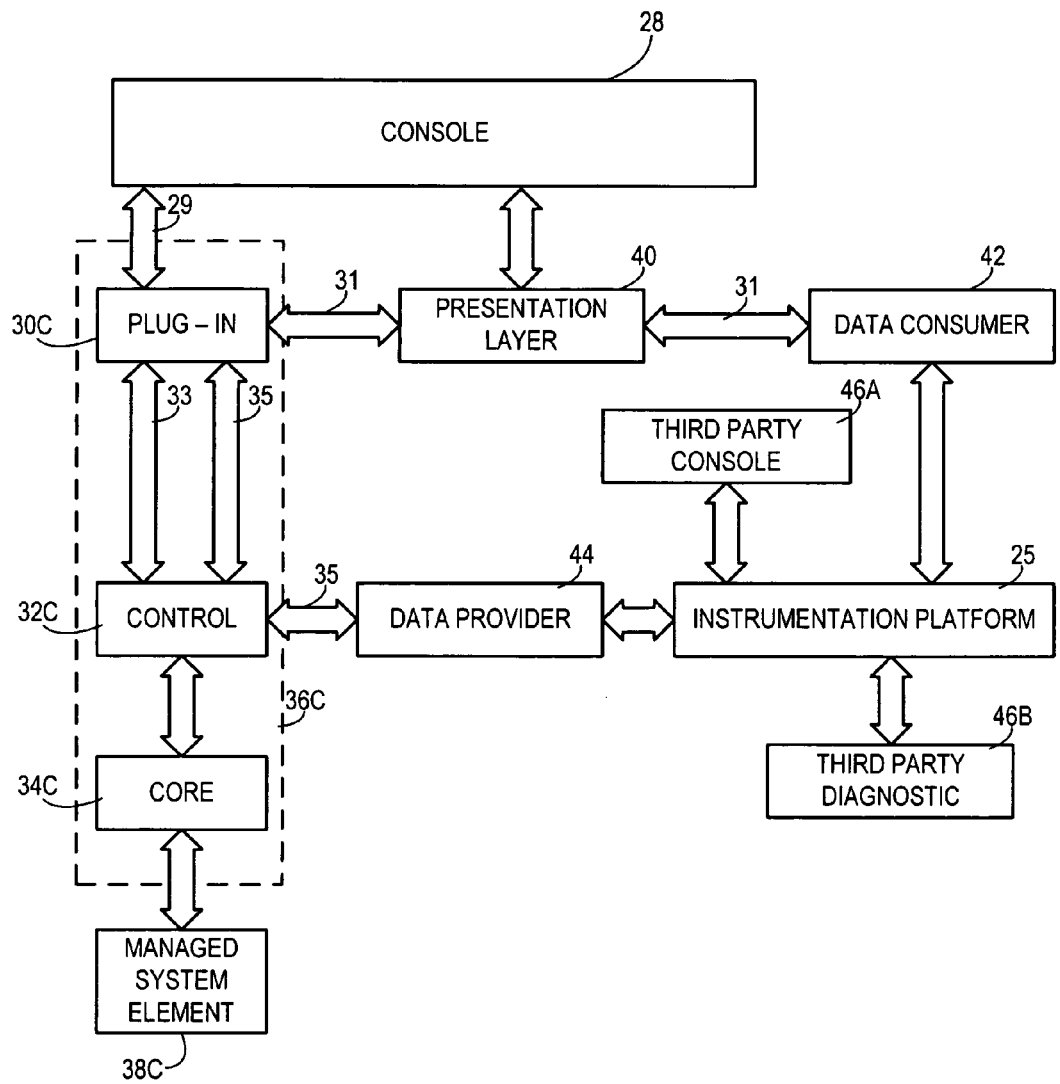
FIG. 4 is a software architecture diagram showing an illustrative software architecture for a diagnostics application program provided according to one embodiment of the present invention.

Turning now to FIG. 4, additional aspects of a diagnostics application program 24 provided according to various embodiments of the invention will be described. As shown in FIG. 4, in various embodiments of the present invention, an instrumentation data consumer 42 and an instrumentation data provider 44 are provided for enabling communication with an instrumentation platform 25.

The instrumentation data provider 44 provides a communication path between the instrumentation platform 25 and the diagnostic control module 32C. In this manner, a third-party console 46A may utilize the diagnostic control module 32C and receive diagnostic information regarding the managed system element 38C. Moreover, the instrumentation data provider 44 may generate event messages compatible for use with the instrumentation platform 25. Other objects may subscribe for these events through the instrumentation platform 25 and receive the event messages without polling a results object. Additional details regarding the operation of the instrumentation data provider 44 will be described in greater detail below.

The instrumentation data consumer 42 provides a communication path between the instrumentation platform 25 and the presentation layer 40. Through the instrumentation data consumer 42, the presentation layer 40 and the console application 28 have access to diagnostic information maintained by the instrumentation platform 25. For instance, through the instrumentation data consumer 42, the presentation layer 40 can execute and receive diagnostic result messages from third-party diagnostics 46B configured for use with the instrumentation platform 25 and not otherwise usable by the console application 28. Additionally, the data consumer 42 may register to receive diagnostic event messages from the instrumentation platform 25. The event messages when received may then be converted by the data consumer 42 for use by the presentation layer 40 and the console application 28. Additional details regarding the operation of the instrumentation data consumer 42 will be described in greater detail below.

Figure 5:
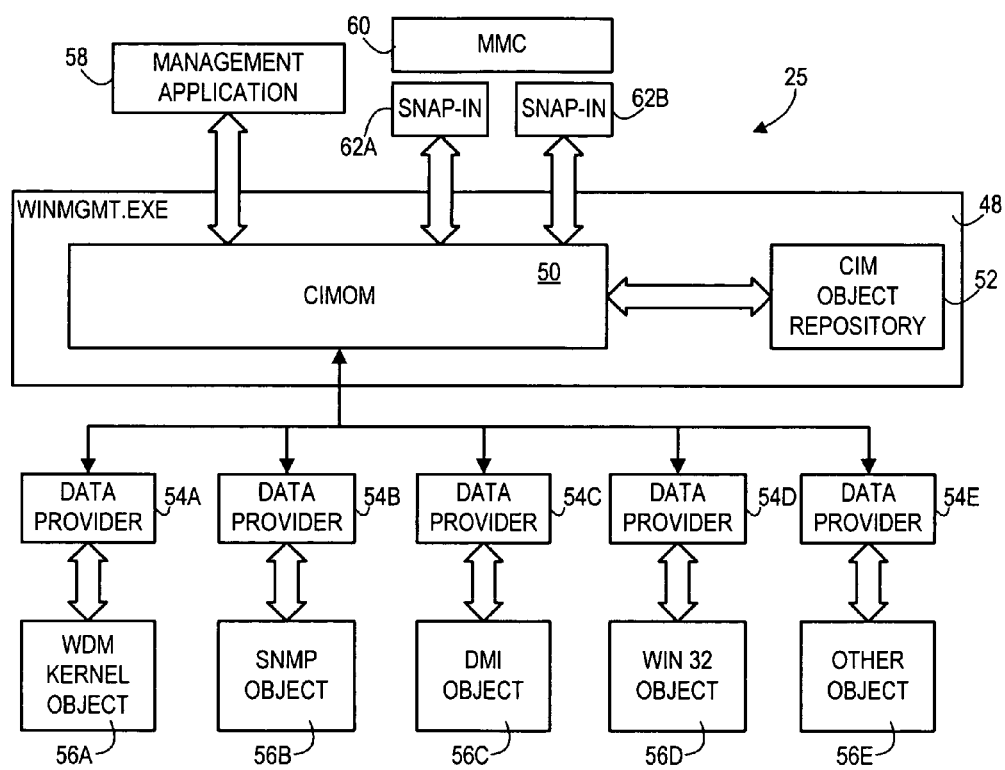
FIG. 5 is a software architecture diagram showing the architecture of an instrumentation platform utilized in various embodiments of the present invention.

Referring now to FIG. 5, an illustrative instrumentation platform 25 will be described. As described above, the instrumentation platform 25 comprises one or more executable programs for modeling components within a computer system, for receiving configuration, status, and operational information from the components, and for executing diagnostics on system components and receiving events generated by system components. In the actual embodiment of the present invention described herein, the instrumentation platform 25 is WINDOWS management instrumentation ("WMI") from MICROSOFT CORPORATION.

WMI is MICROSOFT CORPORATION'S implementation of the Desktop Management Task Force's ("DMTF") Web-Based Enterprise Management ("WBEM") initiative. As known to those skilled in the art, WMI is a set of system services and programming interfaces that allow applications to expose management instrumentation data in a consistent way. By exposing instrumentation data in a consistent fashion, management applications can be written to a single API. WMI also provides a set of services, such as eventing, remoting, asynchronous access, scripting, and a query language, that allow applications and management tools to better access and serve instrumentation data without requiring information providers to explicitly support those features. It should be appreciated by those skilled in the art that while the actual embodiment of the present invention described herein utilizes WMI as the instrumentation platform 25, the present invention may also be practiced with other management platforms, including other implementations of WBEM.

In WMI, a single executable process, WINMGMT.EXE 48, provides all of the WMI functionality. This executable supports a Common Information Model ("CIM") object repository 52 that provides a central storage area for instrumentation data, a CIM object manager 50 ("CIMOM") that provides applications with uniform access to management data, and the APIs that together deliver WMI. Applications depend on the CIMOM 50 to handle the interface between a management application 58 and data providers 54A–54N. WMI facilitates these communications by supporting a COM interface. The WMI COM API also supplies event notification and query processing services and can be used in several programming language environments, such as 'C' and 'C++'.

The CIM repository 52 holds the CIM and associated schema, along with data information or data source details. The CIMOM 50 uses the schema data contained in the CIM repository 52 when servicing requests from a management application 58 for data regarding managed objects 56A–56N. A management application 58 is an application or operating system service that uses or processes information originating from managed objects 56A–56N. The console application 28 comprises one type of management application. Through the use of the present invention, the management application 58 may obtain instance information, write properties, and execute methods on the objects 56A–56N. A management application 58 can access managed object information by making requests to the CIMOM 50 through one of the methods provided in the WMI API. In WMI, the CIMOM 50 may also use the schema data in the CIM repository 52 when servicing requests from a management console 60 received through "snap-ins" 62A–62N.

The managed objects 56A–56N are either physical or logical enterprise components that are modeled using CIM. For example, a managed object can be hardware such as a cable, or software such as a database application. Managed objects 56A–56N may include a Windows Driver Model ("WDM") kernel object 56A, a Simple Network Management Protocol ("SNMP") object 56B, a Desktop Management Interface ("DMI") object 56C, a WIN32 object 56D, or other type of object 56N.

The CIMOM 50 communicates with the managed objects 56A–56N through the data providers 54A–54N. The data providers 54A–54N are standard COM and distributed COM ("DCOM") servers that function as mediators between the managed objects 56A–56N and the CIMOM 50. The data providers 54A–54N supply instrumentation data for parts of the CIM schema. If the CIMOM 50 receives a request from a management application 58 for data that is not available from the CIM object repository 52, or for event notifications that are not supported by the CIMOM 50, the CIMOM 50 forwards the request to the appropriate one of the data providers 54A–54N. The data providers 54A–54N can then supply data and event notifications for the specific managed object 56A–56N to the CIMOM 50. In turn, this data can be returned by the CIMOM 50 to the management application 58. As will be described below, a data provider 44 is provided herein that provides an interface between the instrumentation platform 25 and control 32 of the triplet 36. Through the use of the data provider 44, the instrumentation platform 25 can perform diagnostic functions on a managed system element 38 in the same manner that management functions are performed on the objects 56A–56N.

Instrumentation events may also be processed in WMI. An event is an occurrence that either corresponds to specific, previously defined conditions that arise (extrinsic events) or to changes in the CIM repository (intrinsic events). After an event occurs, an event provider notifies the CIMOM 50. The CIMOM 50 then delivers a notification to one or more registered recipients known as event consumers. Event consumers can register with the CIMOM 50 to receive particular types of notifications and event providers can register to supply particular types of information.

To enable event consumers to operate independently from event providers, the CIMOM 50 acts as the intermediary, matching registered consumers with responsible providers and forwarding appropriate events. As known to those skilled in the art, event consumers register to receive notifications without knowing how the events and notifications are provided. To register, these consumers specify a filter. The filter is created using the WMI Query Language ("WQL"). WQL describes the conditions under which the consumer wants to receive event notification. As will be described in greater detail below, the data provider 44 may register with the CIMOM 50 as an event provider and the data consumer 42 may register with the CIMOM 50 as an event consumer.

According to the various embodiments of the present invention, the CIMOM 50 supports the use of data providers that implement the Common Diagnostics Model ("CDM"). As known to those skilled in the art, CDM defines a methodology for adding diagnostics to the CIM. The CDM specification is governed by the DMTF and is a part of the CIM, version 2.3 and higher. According to CDM, a diagnostic is broken into two parts: a diagnostic provider and a diagnostic consumer. The diagnostic consumer is a test module that requests a test, or calls the methods in a diagnostic provider, to perform a single test or set of tests on a particular managed system element. A diagnostic provider registers itself through CIM to export events and methods supported. When a diagnostic test module queries CIM for diagnostics supported on a given device, CIM will report about the instance of the diagnostic provider, This effectively establishes communication between the provider and the consumer. The consumer can then enable events and execute methods registered by the provider. It should be appreciated that the data provider 44 performs the functions of a diagnostic provider and that the data consumer 42 performs the functions of a diagnostics consumer herein.

Figure 6:
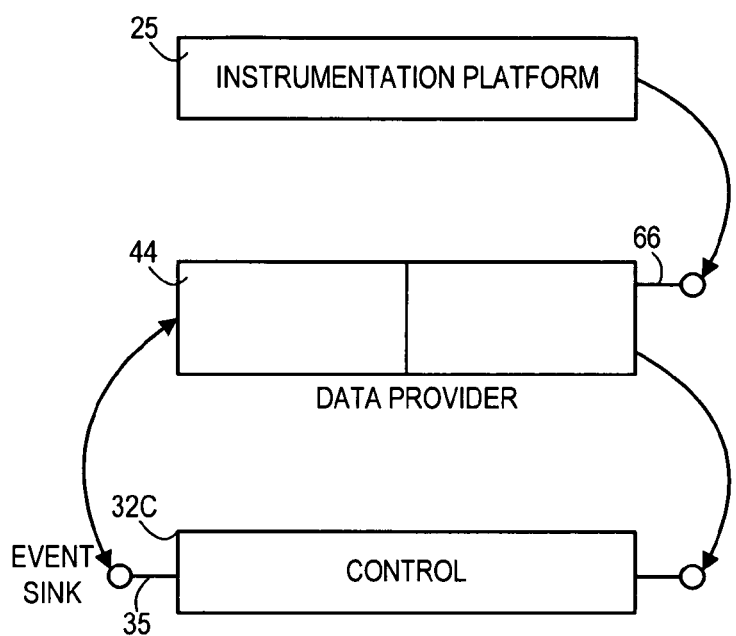
FIG. 6 is a software architecture diagram showing aspects of an instrumentation data provider module provided in one embodiment of the present invention.

Turning now to FIG. 6, additional details regarding the operation of the instrumentation data provider module 44 will be described. As shown in FIG. 6, the diagnostic control object 32C provides an interface 35 for communicating with the instrumentation data provider module 44. According to one embodiment of the invention, the interface 35 supported by the control object 32C may be called by the data provider 44 to instantiate diagnostics and perform other tasks. In particular, the interface 35 comprises an interface that is compatible with the interface 35 utilized for communication between the control object 32C and the plug-in 30C. By supporting the same interface used by the control object 30C to communicate with the plug-in 30C, the data provider 44 can provide an interface to the instrumentation platform 25 without requiring that the control 32C be rewritten.

According to one embodiment of the invention, the instrumentation data provider 44 also supports an interface 66 for communication with the instrumentation platform 25. In one embodiment of the invention, the data provider 44 provides a communication path between the instrumentation platform 25 and the diagnostic control object 32C. In this manner, the data provider 44 can convert data received from the control 32C to a format compatible with the instrumentation platform 25 and convert data received from the instrumentation platform 25 to a format compatible with the control 32C. In particular, the instrumentation platform 25 has access to the control 32C through the interface 35 and can initiate diagnostics. The control 32C can also pass diagnostic status messages back to the instrumentation platform 25 for use by the instrumentation platform 25.

According to one embodiment of the invention, the data provider 44 is also operative to register with the instrumentation platform 25 as an event provider. Once the data provider 44 has registered, data received from the control 32C can be converted to event messages compatible with the instrumentation platform 25. For instance, diagnostic status messages may be received from the control 32C and converted to event messages compatible with the instrumentation platform 25. The event messages may then be provided to data consumers that have registered to receive the event messages.

Figure 7:
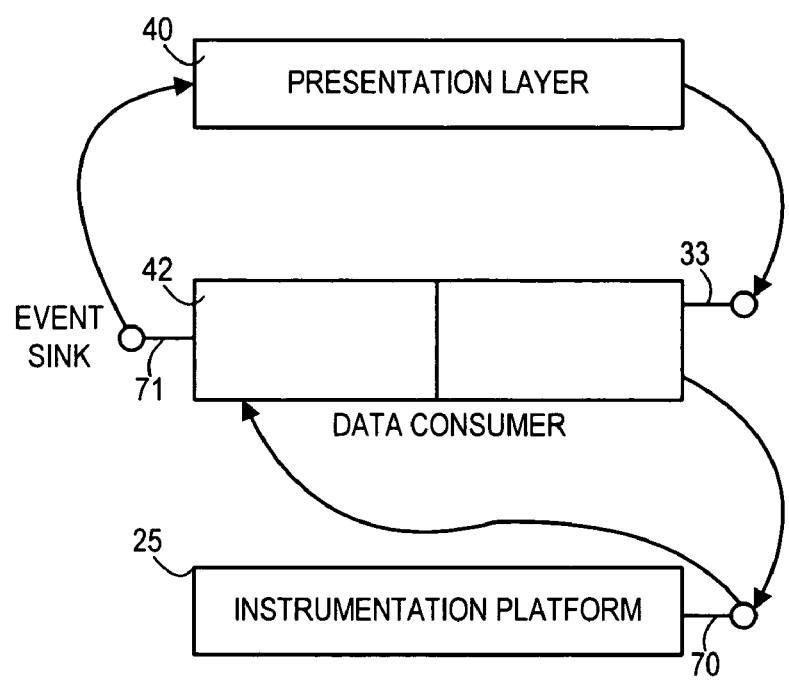
FIG. 7 is a software architecture diagram showing aspects of data consumer module provided in one embodiment of the present invention.

Referring now to FIG. 7, additional details regarding the instrumentation data consumer module 42 will be provided. As described briefly above, the data consumer module 42 provides an interface 33 for communication with a presentation layer 40. According to one embodiment of the invention, the interface 33 supports a legacy interface utilized by the presentation layer 40 for communication with the plug-in 30C. By supporting a legacy interface, the data consumer module 42 can provide the presentation layer 40 with access to the instrumentation platform 42 without requiring that the presentation layer 40 be rewritten.

The data consumer module 42 also includes an event sink 71 for receiving event messages from the instrumentation platform 25. The data consumer module 42 is also operative to convert data received from the instrumentation platform 25 to a format compatible with the presentation layer 40 and to convert data received from the presentation layer 40 to a format compatible with the instrumentation platform 25. In particular, according to one embodiment of the present invention, the data consumer 42 is operative to register with the instrumentation platform 25 as an event consumer. By registering with the instrumentation platform 25 as an event consumer, the data consumer 42 will receive event messages via the event sink 71. In this manner, the data consumer 42 can receive event messages, such as diagnostic event messages, from the instrumentation platform 25 without having to poll a results object. The data consumer 42 may then pass the event messages to the presentation layer 40.

Figure 8:
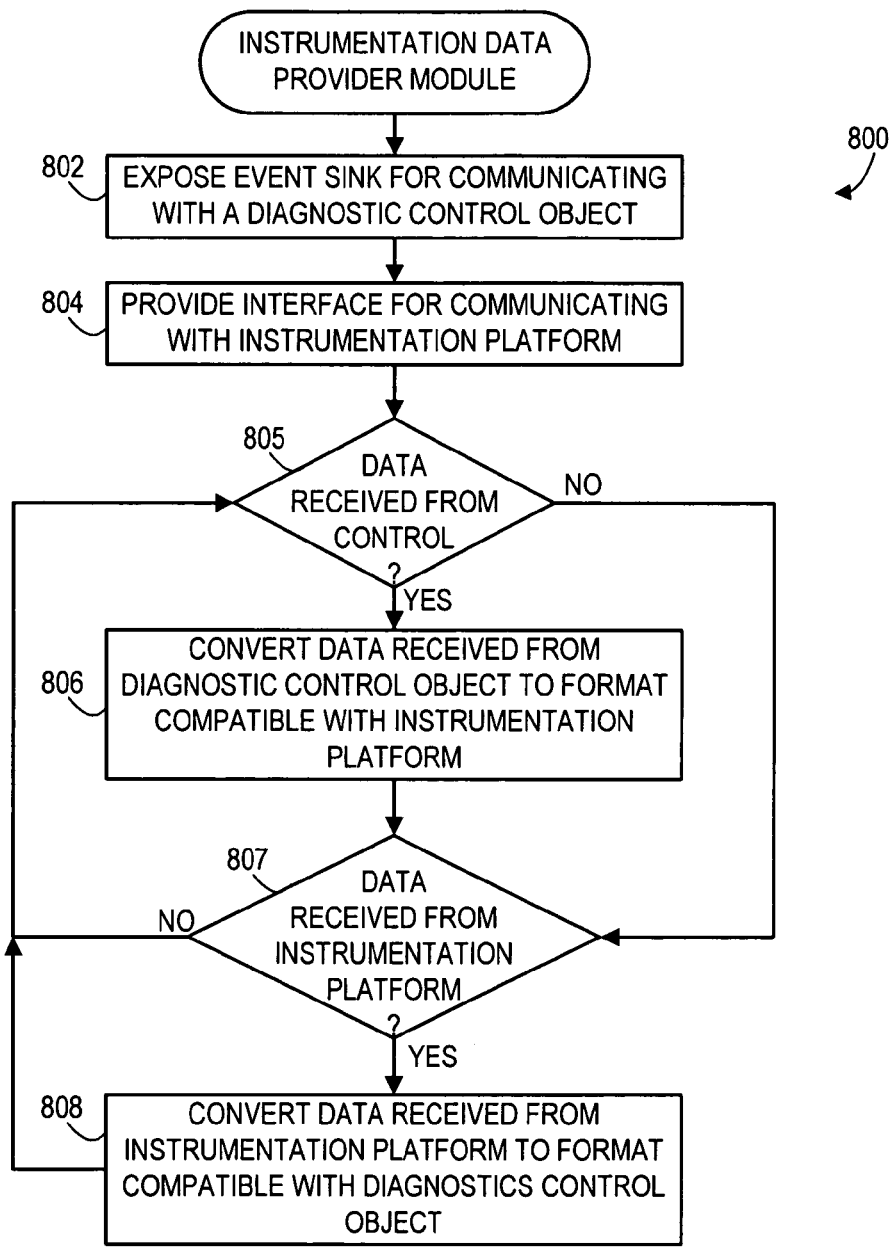
FIG. 8 is a flow diagram illustrating the operation of an instrumentation data provider module utilized in various embodiments of the present invention.

Referring now to FIG. 8, an illustrative routine 800 will be described illustrating the operation of the instrumentation data provider module 44 according to one actual embodiment of the present invention. The routine 800 begins at block 802, where the diagnostic control object 32C provides an interface 35 for communicating with an instrumentation data provider module 44. As described above, the interface 35 comprises a legacy interface supported by the diagnostic control object 32C in one embodiment of the present invention.

From block 802, the routine 800 continues to block 804, where the instrumentation data provider module 44 provides an interface 66 for communicating with an instrumentation platform 25. As described above, the data provider 44 can generate instrumentation event messages to the instrumentation platform 25 through the interface. Moreover, the data provider 44 can return instrumentation information to the instrumentation platform 25 in response to queries.

From block 804, the routine 800 continues to block 805. At block 805, a determination is made as to whether data has been received at the data provider module 44 from the control object 32C. If data has been received from the control, the routine 800 continues to block 806. If data has not been received from the control, the routine 800 branches to block 807. At block 806, the data provider 44 converts data received from the diagnostic control object 32C to a format compatible with the instrumentation platform 25. As described above, this process may include converting diagnostic status messages and other types of messages received from the control 32C to event messages compatible with the instrumentation platform 25. Other types of data received from the control 32C may also similarly be converted to a format compatible with the instrumentation platform 25.

The routine 800 continues from block 806 to block 807, where a determination is made as to whether data has been received at the data provider module 44 from the instrumentation platform 25. If data has not been received from the instrumentation platform 25, the routine 800 branches back to block 805. If data has been received from the instrumentation platform 25, the routine 800 continues to block 808. At block 808, the data provider 44 converts data received from the instrumentation platform 25 to a format compatible with the diagnostic control object 32C. As described above, this allows the instrumentation platform 25 to execute diagnostics and request information from the control 32C. From block 808, the routine 800 returns to block 805, where the conversion process is repeated.

Figure 9:
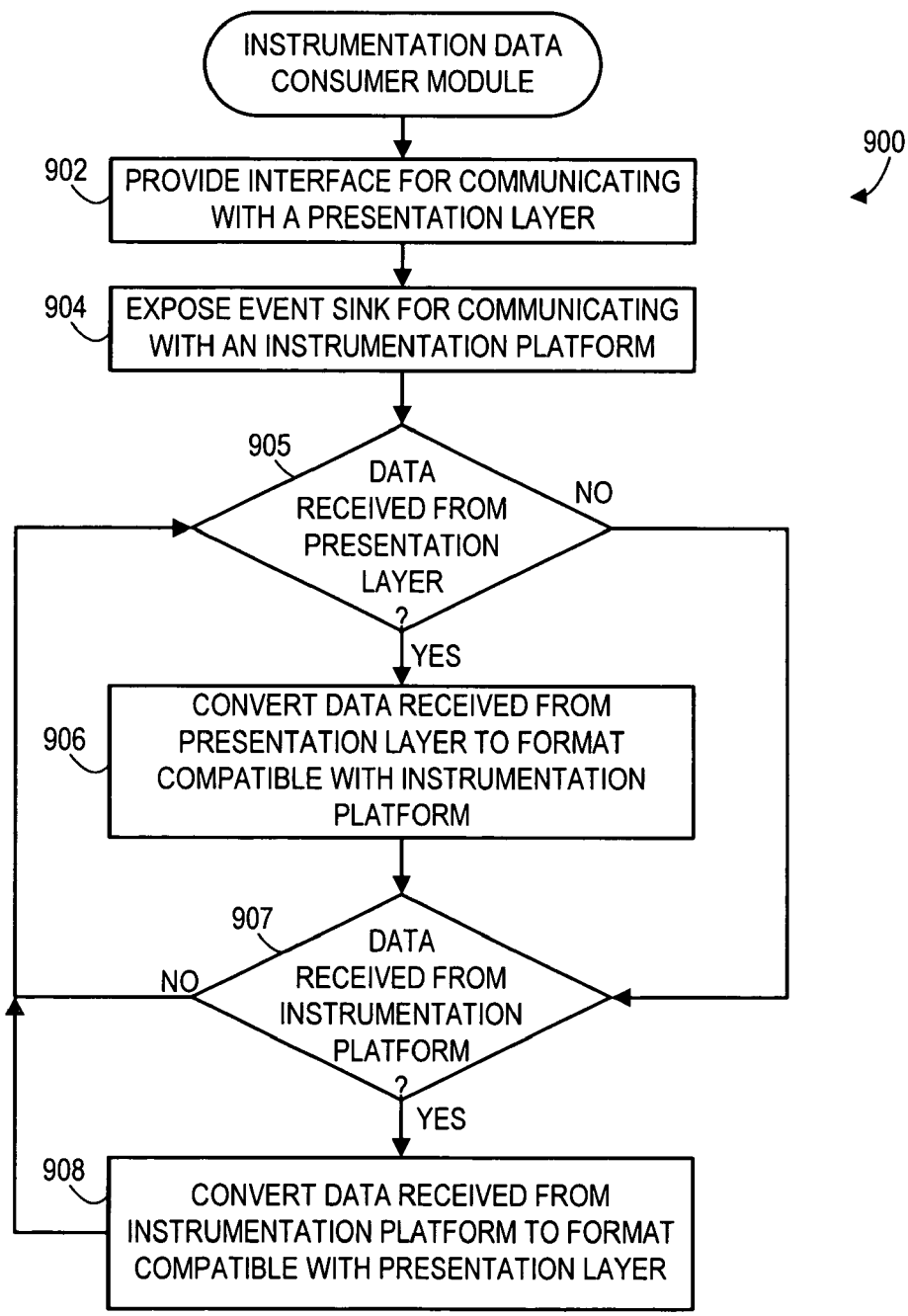
FIG. 9 is a flow diagram illustrating the operation of a data consumer module utilized in various embodiments of the present invention.

Turning now to FIG. 9, a routine 900 will be described that illustrates the operation of an instrumentation data consumer module 42 according to one actual embodiment of the invention. The routine 900 begins at block 902, where the instrumentation data consumer module 42 provides an interface 33 for communicating with the presentation layer 40. As described above, the interface 33 comprises a legacy interface supported by the presentation plug-in 30C in one embodiment of the present invention.

From block 902, the routine 900 continues to block 904, where the instrumentation data consumer module 42 exposes an event sink 71 for receiving messages from an instrumentation platform 25. As described above, the data provider 44 can register to receive instrumentation event messages with the instrumentation platform 25 through the event sink 71. From block 904, the routine 900 continues to block 905, where a determination is made as to whether data was received at the instrumentation data consumer module 42 from the presentation layer 40. If data was not received, the routine 900 branches from block 905 to block 907. If data was received, the routine 900 continues from block 905 to block 906.

At block 906, the data consumer 42 converts data received from the presentation layer 40 to a format compatible with the instrumentation platform 25. As described above, this process may include converting requests for diagnostic data and other types of messages received from the presentation layer 40 to messages compatible with the instrumentation platform 25. Other types of data received from the presentation layer 40 may also similarly be converted to a format compatible with the instrumentation platform 25.

The routine 900 continues from block 906 to block 907, where a determination is made as to whether data has been received at the instrumentation data consumer module 42 from the instrumentation platform 25. If data was not received from the instrumentation platform 25, the routine 900 branches back to block 905. If data was received from the instrumentation platform, the routine continues from block 907 to block 908. At block 908, the data consumer 42 converts data received from the instrumentation platform 25 to a format compatible with the presentation layer 40. For instance, the data consumer 42 may convert event messages received from the instrumentation platform 25 to a format compatible with the presentation layer 40. As described above, this allows the presentation layer 40 to receive and display diagnostic information from the instrumentation platform 25. From block 908, the routine 900 returns to block 905, where the conversion process is repeated.

Figure 10:
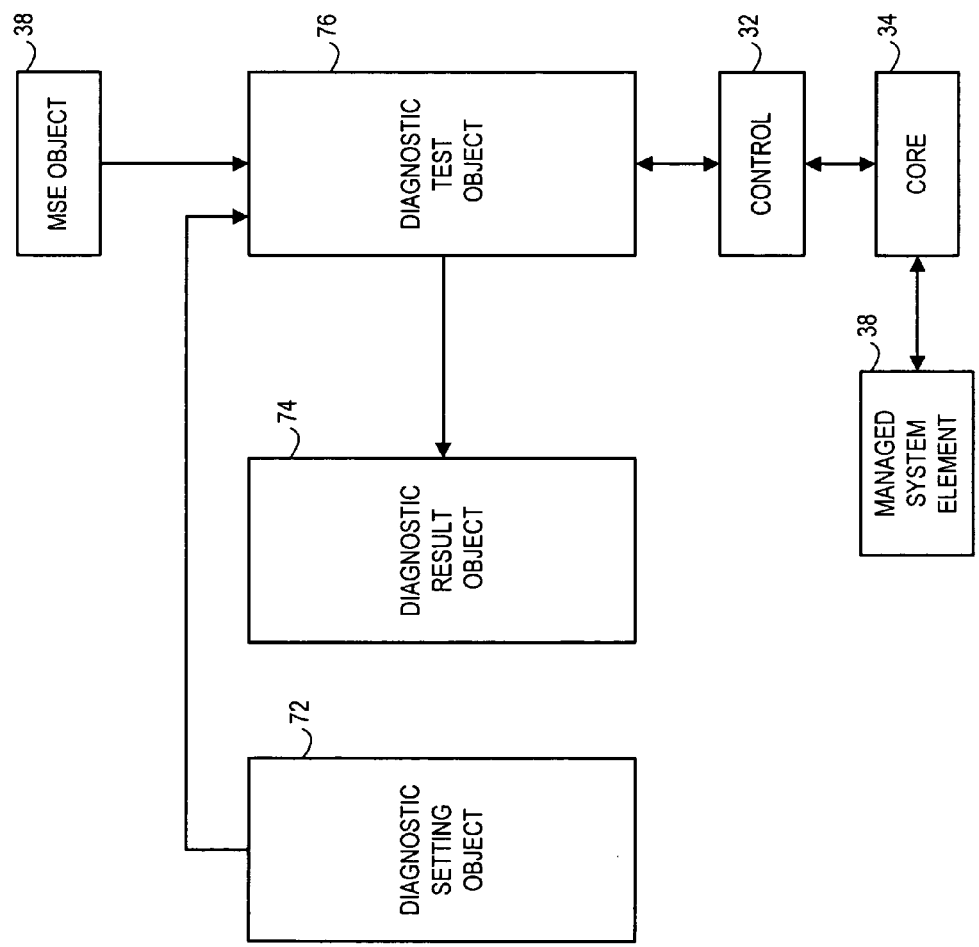
FIG. 10 is a software architecture diagram showing various software objects utilized in a standard management platform.

Referring now to FIG. 10, additional details regarding the object model utilized by industry-standard implementations of CDM will be described. As discussed briefly above, CDM builds upon CIM and defines standard enabling building blocks that allow "plug-in" diagnostics modules to be integrated with console application programs. According to CDM, a diagnostic is broken into two parts: a diagnostic provider and a diagnostic consumer. The diagnostic consumer is a test module that requests a test and the diagnostic provider is a module that performs the actual diagnostic and exports events and properties. In order to comply with the industry-standard requirements for CDM, diagnostic providers must be subclassed from three classes: CIM_DiagnosticTest, CIM_DiagnosticSetting, and CIM_DiagnosticResult, all of which are defined by the CDM standard.

A diagnostic test object 76 that is subclassed from the CIM_DiagnosticTest class communicates with the control 32 and the core 34 to perform the actual diagnostic tests on the managed system element 38. A diagnostic settings object 72 that is subclassed from the CIM_DiagnosticSetting class is used to store the default settings for a diagnostic test. The diagnostic setting object 72 is utilized by the diagnostic test object 76 when performing a diagnostic test.

As will be described in greater detail below with reference to FIG. 11, the default properties of the diagnostic setting object 72 are defined by the industry-standard CIM_DiagnosticSetting class. Additionally, according to the various embodiments of the present invention, the diagnostic setting object 72 may also include device-specific settings that are specific to the particular managed element upon which the diagnostic is to be performed. Once the diagnostic has completed, the diagnostic result object 74 is utilized by the diagnostic test object 76 to store and report the results of the diagnostic test. The diagnostic result object 74 is subclassed from the CIM_DiagnosticResult class.

Figure 11:
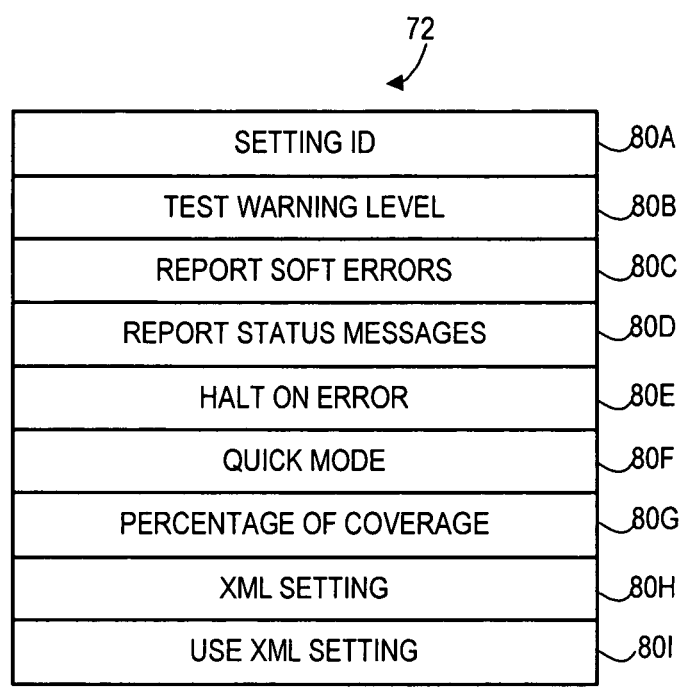
FIG. 11 is a data structure diagram illustrating aspects of a diagnostic setting object utilized by the various embodiments of the invention.

Referring now to FIG. 11, additional details regarding the format and structure of the diagnostic setting object 72 will be provided. As discussed briefly above, the diagnostic setting object 72 comprises an object that has been subclassed from the CIM_DiagnosticSetting class as specified in the CIM standard. In particular, the diagnostic setting object 72 comprises a number of properties 80A–80G that are defined by the CIM_DiagnosticSetting class. The setting ID property 80A comprises a string that uniquely identifies the diagnostic setting object 72. The test warning level property 80B is a value mapped integer that sets the level of warning messages to be logged. If, for example, no warning is required, the test warning level property 80B would be set to an integer corresponding to "No Warnings."

The report soft errors property 80C is a Boolean value that determines whether soft errors are reported. Soft errors are messages from the diagnostic test object 76 that relate to a known defect in the hardware or driver and that have a valid workaround. The report status messages property 80D is a Boolean value that instructs the diagnostic test object 76 to report status information when set to "True." The halt on error property 80E will cause the diagnostic test object 76 to halt the diagnostic test after the first error is found when set to "True." The quick mode property 80F is a Boolean value that instructs the diagnostic test object 76 to run the diagnostic test in an accelerated fashion either by reducing the coverage or number of tests performed when set to "True." The percentage of coverage property 80G is an integer value that instructs the diagnostic test object 76 to reduce test coverage to the specified percentage.

In addition to the default properties 80A–80G that are defined by the CIM_DiagnosticSetting class, the diagnostic setting object 72 also includes several properties 80H–80I that are specific to the managed system element to be tested by the diagnostic test. In particular, according to one embodiment, an XML setting property 80H is provided that comprises a string containing device-specific diagnostic settings for the managed system element to be tested. The contents of the XML setting property 80H may include a string containing XML tags defining the device-specific diagnostic settings. The contents of the XML setting property 80H are utilized by the diagnostic test object 76 to customize the diagnostic test for the managed system element being tested. Additional details regarding the format and structure of the XML setting property 80H will be provided below with respect to FIGS. 12A–12C.

According to one embodiment of the invention, the diagnostic setting object 72 also includes a use XML setting property 80I. The use XML setting property 80I is a Boolean precedence property utilized by the diagnostic test object 76. If the use XML setting property 80I is set to "True," then the diagnostic test object 76 will utilized the device-specific settings specified in the XML setting property 80H. If the use XML setting property 80I is set to false, the diagnostic test object 76 will utilize the default settings specified by the properties 80A–80G.

Figure 12A:
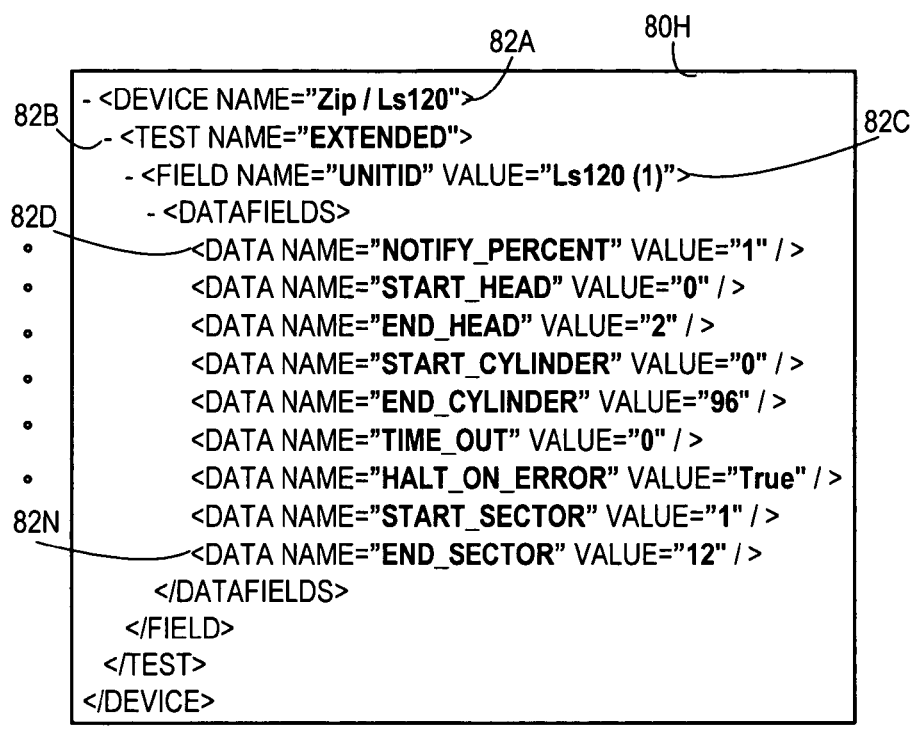
FIGS. 12A–12C are illustrative extensible markup language data structures illustrating aspects of a XML setting field utilized by the various embodiments of the invention.
Figure 12B:
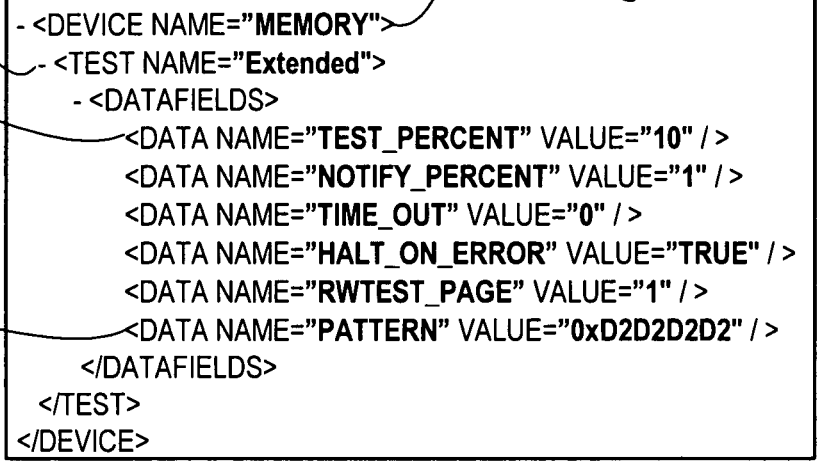
Figure 12C:
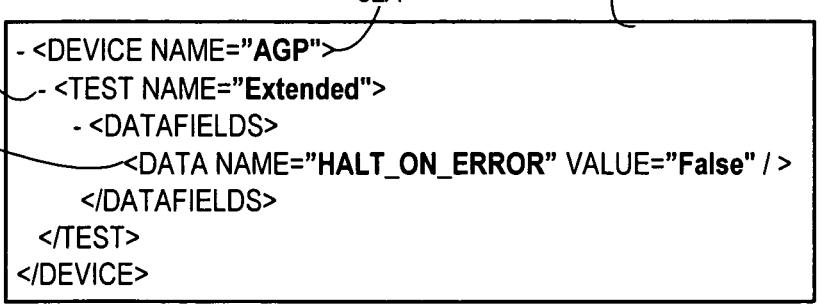

Referring now to FIGS. 12A–12C, additional aspects of the XML setting property 80H will be provided. As discussed briefly above, the XML setting property 80H is a text property that includes device-specific settings expressed in XML. As shown in FIG. 12A, the XML setting property 80H may include one or more XML tags that express various device-specific properties for the diagnostic test. In particular, according to one embodiment of the invention, the XML setting property 80H includes a device name tag 82A that identifies the device category of the managed system element to which the device-specific properties apply. The managed system element is identified in the "value" attribute of the "field" tag whose "name" attribute is "UNITID". For instance, the device name tag 82A shown in FIG. 12A identifies the device category called "Zip/Ls120" and includes a "field" tag whose "value" attribute identifies the managed system element as "Ls120(1)". In the example shown in FIG. 12B, the device name tag 82A identifies the device category called "memory." In FIG. 12C, the device name tag 82A identifies the device category named "AGP."

The XML setting property 80H may also include a test name tag 82B that identifies the particular diagnostic test to which the setting apply. In the examples shown in FIG. 12A–12C, the test name tags 82B indicate that the settings apply to the "extended" test.

According to the various embodiments of the invention, the XML setting property 80H also includes one or more device-specific setting tags 82D–82N that identify one or more settings for the diagnostic test specific to the managed system element identified by the "value" attribute of the "field" tag within the device name tag. 82A. In the example XML setting property 80H shown in FIG. 12A, the device-specific setting tag 82D indicates that a notification should be provided regarding the progress of the diagnostic test after every one percent of the test has been completed. As another example, the device-specific setting tag 82N indicates that the end sector for the diagnostic test is twelve. The other device-specific setting tags provided other types of information for the diagnostic test. For instance, the device-specific setting tag 82D, shown in FIG. 12C, indicates that the diagnostic test should not be halted immediately when an error is encountered.

It should be appreciated that the XML setting property 80H may be expressed using a data structure configured for use with the diagnostic setting object 72. Moreover, it should be appreciated that while the device-specific diagnostic settings are expressed using XML in the illustrative embodiment provided herein, other types of data structures, languages, and formats may be utilized to express the device-specific settings.

Figure 13A:
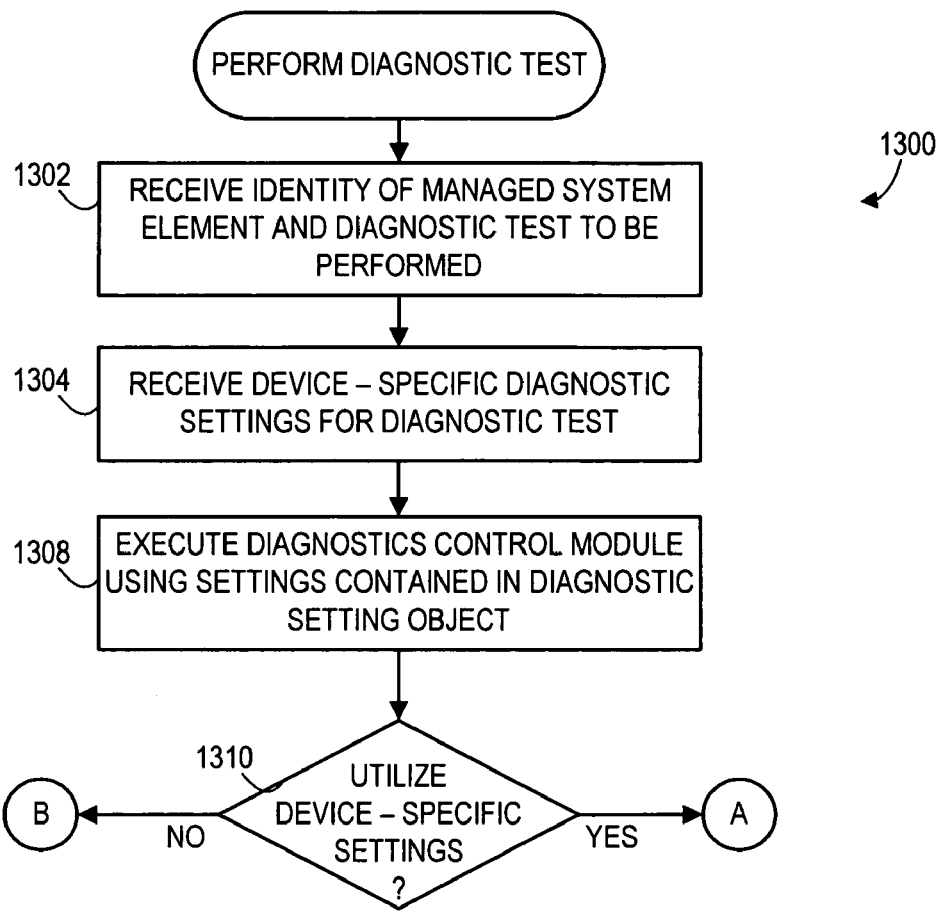
FIG. 13 is a flow diagram showing an illustrative routine for performing a diagnostic test within a standard management platform utilizing device-specific diagnostic settings.
Figure 13B:
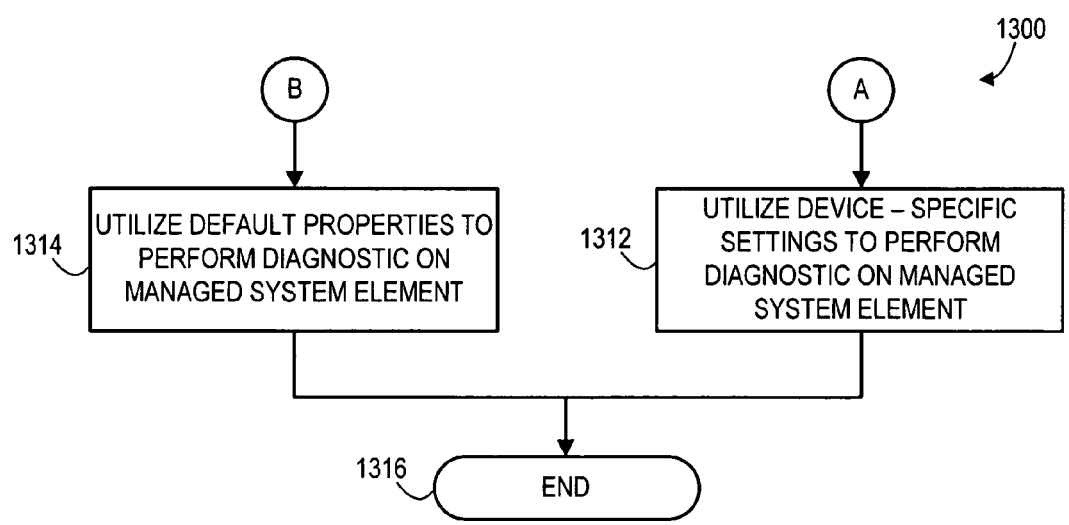

Turning now to FIGS. 13A–13B, an illustrative routine 1300 will be described for performing a diagnostic test on one or more managed system elements using device-specific settings. The routine 1300 begins at block 1302, where the identities of one or more managed system elements and a diagnostic test to be performed on the managed system elements is received. This information may be received from a user or provided through programmatic means, such as through the use of a script. From block 1302, the routine 1300 continues to block 1304.

At block 1304, one or more device-specific diagnostic settings are received. As described above with respect to FIGS. 12A–12C, the device-specific diagnostic settings are specific to the diagnostic test object 76 and are utilized by the diagnostic test object 76 to customize the diagnostic test for the managed system element. The device-specific diagnostic settings may also be received from a user or provided through programmatic means. The routine 1300 then continues from block 1304 to block 1308.

At block 1308, the diagnostic test object 76 and the diagnostic control module 32 are executed for performing the actual diagnostic test. When executed, the diagnostic control modules 32 determines whether the default settings or the device-specific settings should be utilized when the test is performed at block 1310. This is accomplished by examining the contents of the use XML setting property 80I in the diagnostic setting object 72. If the device-specific settings are to be utilized, the routine 1300 branches from block 1310 to block 1312. If the default settings are to be utilized, the routine 1300 branches to block 1314.

At block 1312, the diagnostic test object 76 utilizes the device-specific diagnostic settings contained in the diagnostic setting object 72 to customize the execution of the diagnostic test for the managed system element being tested. At block 1314, the diagnostic test object 76 utilizes the default diagnostic settings contained in the diagnostic setting object 72 to test the managed system element. From blocks 1312 and 1314, the routine 1300 continues to block 1316, where it ends.

Based upon the foregoing, it should be appreciated that embodiments of the invention provide a method, system, computer-controlled apparatus, and computer-readable medium for performing a diagnostic test on one or more managed system elements utilizing device-specific diagnostic settings. The above specification, examples and data provide a complete description of the manufacture and use of the invention. Since many embodiments of the invention can be made without departing from the spirit and scope of the invention, the invention resides in the claims hereinafter appended.

We claim:

1. A system for performing a diagnostic test on one or more managed system elements, the system comprising:
    a managed system element upon which a diagnostic test may be performed;
    a diagnostic setting object derived from an industry-standard diagnostic setting object prototype, the diagnostic setting object comprising one or more properties for the diagnostic test specified by the industry-standard diagnostic setting object prototype and a device-specific settings property identifying one or more properties for the diagnostic test specific to the managed system element; and
    a diagnostics control module for performing the diagnostic test on the managed system element, the diagnostics control module operative to customize the diagnostic test according to the device-specific settings property.

2. The system of claim 1, wherein the one or more properties for the diagnostic test specified by the industry-standard diagnostic setting object prototype include one or more default properties for the diagnostic test and wherein the diagnostic setting object further comprises a precedence property indicating whether the device-specific settings property should be utilized by the diagnostics control module rather than the default properties.

3. The system of claim 2, wherein the diagnostics control module is further operative to determine whether the device-specific settings property or the default properties should be utilized based on the precedence property.

4. The system of claim 3, wherein the device-specific settings property is expressed as a string containing extensible markup language.

5. The system of claim 4, wherein the string includes extensible markup language elements identifying the managed system element.

6. The system of claim 5, wherein the string includes extensible markup language elements identifying the diagnostics test.

7. A method for performing a diagnostic test on one or more managed system elements, the method comprising:
    receiving the identity of a managed system element and a diagnostic test to be performed on the managed system element;
    receiving the identity of a device-specific settings property for the diagnostic test specific to the managed system element;
    determining whether to use the device-specific settings property for the diagnostic test specific to the managed system element or to use one or more properties for the diagnostic test specified by an industry-standard diagnostic setting object prototype when performing the diagnostic test; and
    executing a diagnostics control module for performing the diagnostic test on the managed system element, the diagnostics control module operative to customize the diagnostic test according to the device-specific settings property.

8. The method of claim 7, wherein the one or more properties for the diagnostic test specified by the industry-standard diagnostic setting object prototype include one or more default properties for the diagnostic test and
    wherein determining whether to use the device-specific diagnostic settings object specific to the managed system element or to use the one or more default properties when performing the diagnostic test further comprises examining a precedence property indicating whether the device-specific settings property should be utilized by the diagnostics control module rather than the default properties.

9. The method of claim 8, wherein the device-specific settings property is expressed as a string containing extensible markup language.

10. The method of claim 9, wherein the string includes one or more extensible markup language elements identifying the managed system element.

11. The method of claim 10, wherein the string includes one or more extensible markup language elements identifying the diagnostics test.

12. A computer-readable medium comprising computer-executable instructions which, when executed by a computer, cause the computer to perform the method of claim 7.

13. A computer-controlled apparatus capable of performing the method of claim 7.

14. A computer-readable medium having an extensible markup language data structure stored thereon for use in performing a diagnostic test on a managed system element, the data structure comprising:
    a device name tag identifying the device category of the managed system element;
    a field name tag identifying the managed system element;
    a test name tag identifying the diagnostic test;
    one or more device-specific setting tags identifying one or more properties for the diagnostic test specific to the managed system element; and
    the data structure being configured for use by a diagnostic setting object derived from an industry-standard diagnostic setting object prototype, the diagnostic setting object comprising one or more properties for the diagnostic test specified by the industry-standard diagnostic setting object prototype and a device-specific settings property comprising the data structure.

* * * * *